No. 866,425. PATENTED SEPT. 17, 1907.
E. M. BLOCH.
HAT PIN.
APPLICATION FILED MAY 18, 1907.
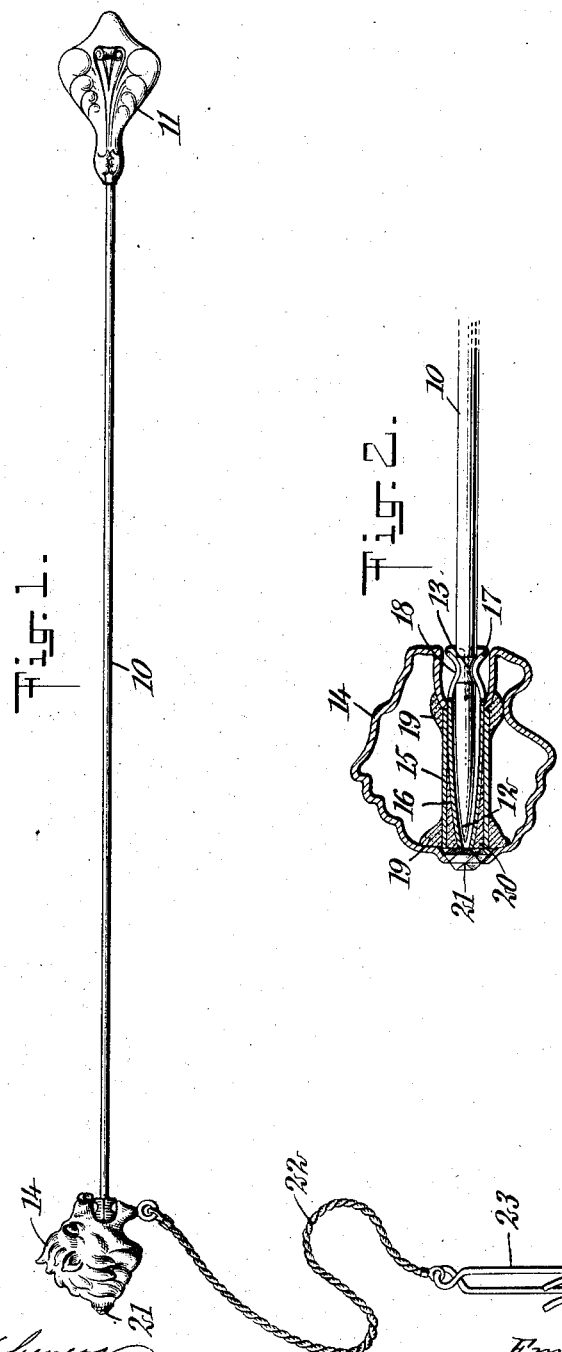
WITNESSES
INVENTOR
Emanuel M. Bloch
BY
ATTORNEYS

UNITED STATES PATENT OFFICE.

EMANUEL M. BLOCH, OF SAG HARBOR, NEW YORK.

HAT-PIN.

No. 866,425.  Specification of Letters Patent.  Patented Sept. 17, 1907.

Application filed May 18, 1907. Serial No. 374,391.

*To all whom it may concern:*

Be it known that I, EMANUEL M. BLOCH, a citizen of the United States, and a resident of Sag Harbor, in the county of Suffolk and State of New York, have invented a new and Improved Hat-Pin, of which the following is a full, clear, and exact description.

This invention relates to certain improvements in pins, and more particularly to hat pins, scarf pins, and the like; the object of the invention being to provide means for engaging with the pin body adjacent the point thereof for holding the pin in place and preventing its accidental displacement, said means also serving as a protection to the point of the pin.

The invention consists in certain features of construction and combinations of parts, all of which will be fully set forth hereinafter and particularly pointed out in the claims.

Reference is to be had to the accompanying drawings, forming a part of this specification, in which similar characters of reference indicate corresponding parts in both the figures, and in which Figure 1 is a view of a hat pin constructed in accordance with my invention; and Fig. 2 is a longitudinal section through one form of the removable head or protector.

In the improved hat pin illustrated in the accompanying drawings, I provide a main body portion 10 having a fixed ornamental head 11 of any suitable character. The opposite end of the body of the pin is tapered to a sharp point 12, and at a short distance from the point there is provided an annular groove 13, all portions of which lie below the normal surface of the pin body. The groove serves to receive certain spring-pressed members upon the removable head, and as it lies below the surface of the pin body, it does not interfere in any way with the free insertion of the pin through the hat.

For protecting the point of the pin and preventing the accidental removal of the pin, I provide a removable head including a shell 14 of any form or configuration desired and having an opening for the reception of the pin point. As shown, the removable head is hollow and provided with a supporting tube 15 leading to an opening in the wall of the head and inclosing an inner tube 16 which engages with the pin point proper. The inner tube 16 extends outward beyond the end of the tube 15, and the outwardly extending portion is provided with a plurality of longitudinal slots forming a plurality of longitudinal fingers 17. The opposite end of the tube is reduced in diameter to a form closely approximating that of the tapered portion of the pin, so as to prevent lateral movement of the removable head in respect to the pin. The tube intermediate the ends of the fingers 17 is provided with an inwardly directed bead 18 of substantially the same cross sectional form as the groove 13, and is adapted to enter said groove and hold the head firmly in engagement with the pin proper. The longitudinal slots in the inner tube 16 and the resiliency of the spring fingers 17 permit the ready insertion of the pin point to the position indicated in Fig. 2, and the head is firmly held in place to protect the point of the pin and prevent the displacement thereof.

The tube 15 may be held in place in any suitable manner, as, for instance, by solder 19, adjacent its ends, and the tube 16 is preferably held within the tube 15 also by the use of solder 20. As illustrated, the removable head represents the head of an animal and is provided with a jewel 21 at the rear side thereof, but it is evident that the specific form of either the fixed or removable head constitutes no portion of the invention hereinafter claimed. The removable head may be connected to the fixed head by a suitable chain, or, as illustrated, the removable head may be provided with a short chain or cord 22 having the free end thereof provided with a suitable hook or pin 23 adapted to be secured to the hat or the hair of the wearer.

By means of the construction above described, the head is firmly and securely fixed in place, but is free to rotate; the head cannot move laterally but is securely held in the desired position; the head cannot become accidentally removed, and the absence of any projection, flanges, or collars on the pin body adjacent the point, permits of a ready insertion of the pin through the hat.

Having thus described my invention, I claim as new and desire to secure by Letters Patent:

As an article of manufacture, a pin having a body and a removable head, the body of the pin having a pointed end and a circumferential groove adjacent thereto and said head comprising a hollow shell having a recess in one side thereof, and a tube extending through said shell from the recess to the opposite side of the shell for receiving the pointed end of the pin and presenting outwardly-extending spring fingers each provided with a curved bead within said recess for engaging in the groove of the pin, the terminal portions of said spring fingers being protected and concealed with said recess and the tube serving to strengthen the shell.

In testimony whereof I have signed my name to this specification in the presence of two subscribing witnesses.

EMANUEL M. BLOCH.

Witnesses:
HENRY A. CAHN,
CLAIR W. FAIRBANK.